Sept. 24, 1946.  H. E. SCHLEICHER  2,408,274
SPRING MOUNTING AND ASSEMBLY FOR SNAP-ACTION ELECTRIC SWITCHES
Filed April 12, 1943

INVENTOR
HAROLD E. SCHLEICHER
BY HIS ATTORNEYS
Howson and Howson

Patented Sept. 24, 1946

2,408,274

UNITED STATES PATENT OFFICE 2,408,274

SPRING MOUNTING AND ASSEMBLY FOR SNAP-ACTION ELECTRIC SWITCHES

Harold E. Schleicher, West Hartford, Conn., assignor to The Arrow-Hart & Hegeman Electric Company, Hartford, Conn., a corporation of Connecticut Application April 12, 1943, Serial No. 482,750

10 Claims. (Cl. 74—84)

This invention relates to a novel arrangement of spiral-coil springs and a mounting therefor, particularly useful in rotary snap-action electric switches.

When spiral-coil type springs are used in hand-operated electric switches of large size and large current carrying capacity, the forces which enter into the snap action become of great importance. Multiplied friction and shock necessarily accompany the use of heavy parts and strong springs. Additionally, the requirement that such devices operate for 50,000 or more cycles without the danger of failure requires a departure from the normal structure of similar small size and small capacity switches, if the operating mechanism is to be kept below cumbersome size and if unwieldy design is to be avoided without resorting to more expensive materials.

It is an object of the invention to provide a balancing of the action of spiral coil springs in a rotary electric switch which enables the use of lighter parts and a compact arrangement giving maximum torque.

Another object is to provide, in a rotary electric snap switch with balanced springs, a means of improved and suitable form to cause operation by direct movement in case the spring arrangement should become disabled or broken.

Other objects and advantages of my invention will become clear as it is described in connection with the accompanying drawing.

Figure 1:
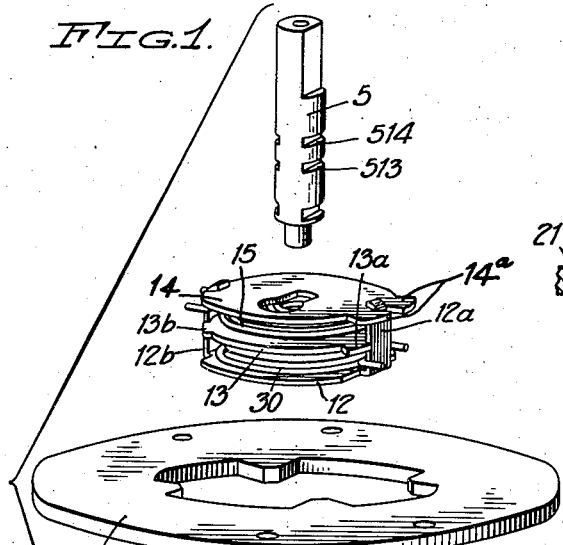
Fig. 1 is an exploded perspective view of switch parts embodying the invention.
Figure 3:
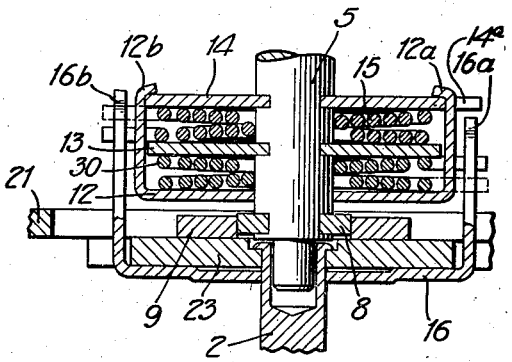
Fig. 3 is a vertical section on slightly larger scale than Fig. 2 and taken in a plane at right angles to the section of Fig. 2. Certain parts are omitted for clearness in Fig. 3.

Referring to the drawing, the invention is illustrated as embodied in a heavy duty rotary electric snap switch mechanism which is mounted above and below a flat mounting plate 20. The mounting plate has a central aperture receiving a bearing disc 3 that is mounted on the upper end of a square contact-carrying shaft 2. The electric switch contacts are non-rotatively mounted on this shaft but their form and details need not be shown or described. The lower end of the shaft 2 is cylindrical and rotates within a bearing plate (not shown). The upper end of the shaft 2 is axially bored to receive and form a bearing for the reduced lower end of a switch operating spindle 5. A dished cover 18 pressed from sheet metal is provided with a central aperture forming the upper bearing for the spindle 5. The top end of the spindle 5 has a handle 6 mounted fixedly thereon for turning the spindle.

A pair of spiral springs 15, 30, preferably of the type illustrated in the Perkins Patent 1,564,016, are coiled about the spindle 5 between substantially circular plates 12 and 14 and are spaced apart by circular plate 13. The middle and top plates 13 and 14 are mounted on and affixed to the spindle by means of key-hole slots, of which the tail portions fit flat grooves 513, 514, cut into the spindle. The bottom plate 12 is provided with upwardly-extending diametrically opposite arms 12a, 12b, parallel to the axis of the spindle 5. For the purpose of dynamically balancing the forces created as the springs are stressed during the snapping of the switch from one position to another, the radially outturned ends of the upper spring 15 embrace the arm 12b, while the ends of the lower spring embrace opposite arm 12a. Tongues on the upper ends of the parallel arms 12a and 12b fit into notches cut into the periphery of the top plate 14; and opposite, but diametrically offset, radially-extending lugs 13a, 13b, of the middle plate 13 abut against the farther sides of the arms 12a and 12b, whereby the three plates 12, 13 and 14 turn as a rigid unit with the spindle 5 and comprise the driving unit of the mechanism.

The driven element of the mechanism comprises a circular plate 16 having upwardly-extending arms 16a, 16b at diametrically opposite positions parallel and outside of the upwardly-extending arms 12a, 12b, of the driving unit. The arms 12b and 16b are embraced by the radially outturned ends of the upper coil spring 15 while the arms 12a and 16a are embraced by the radially-outturned arms of the lower spring 30.

To hold the driven element 16 stationary while the driving unit is being tensioned by rotation of the handle, a common escapement mechanism is provided, consisting of an eccentric cam member 8 rotating with the spindle 5, and received within a circular aperture in a specially-shaped detent plate 9 which slides upon a guide plate 23. For guiding the movement of the detent toward the shaft as the eccentric turns, the guide plate 23 has a radial slot receiving the head of a pin 10 which is affixed in and projects down from the segmental portion of the detent. The guide plate 23 is arranged to rotate with the driven member 16 by reason of radial notches provided in diametrically opposite positions and receiving the arms 16a, 16b of the driven member.

In operation, turning the spindle 5 with attached spring unit 12, 13 and 14 causes both springs 15 and 30 to be stressed by reason of arms 12a and 12b moving one end of springs 30 and 15, respectively, while the other ends remain anchored by the arms 16a and 16b. The torque created is in the form of a couple acting on the driven member 16. This avoids any tendency to wear away one side of the bearing washer 3 or spindle 5 at its point of engagement with the cover; also the striking force or shock of the parts coming to rest is distributed; also the amount of friction between the spring means and its operating arms is halved and distributed between the two springs. Finally, maximum torque is developed within minimum space requirements.

In some circumstances, it is necessary to operate the switch even in case of disabling or breaking of the springs. To make that possible, I have provided radial extensions 14a from the top plate 14 on either side of arm 12a of the driving means. The arm 16a terminates below these extensions so as not to be engaged thereby; but on the opposite side the arm 16b of the driven member 16 is extended high enough to be engaged by the extensions 14a if the springs 15 and 30 should break. This engagement would positively and directly move the driven member to operate the switch in an emergency.

By the novel arrangement and combination herein described, standard materials may be used and the size and cost of the device kept at a minimum, and at the same time, failure of old designs of switches below their required life has been turned into success.

Figure 4:
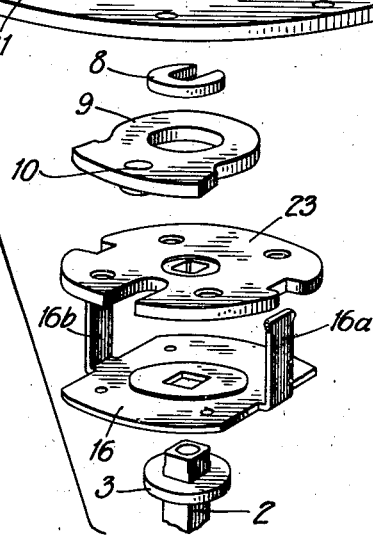
Fig. 4 is a plan view of another form of spring mounting, usable in the combination of Figs. 1–3.
Figure 4:
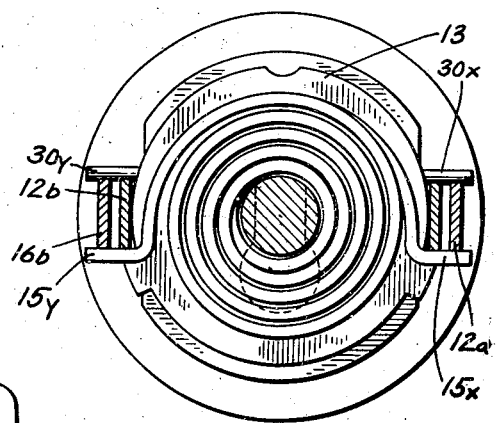
Figure 2:
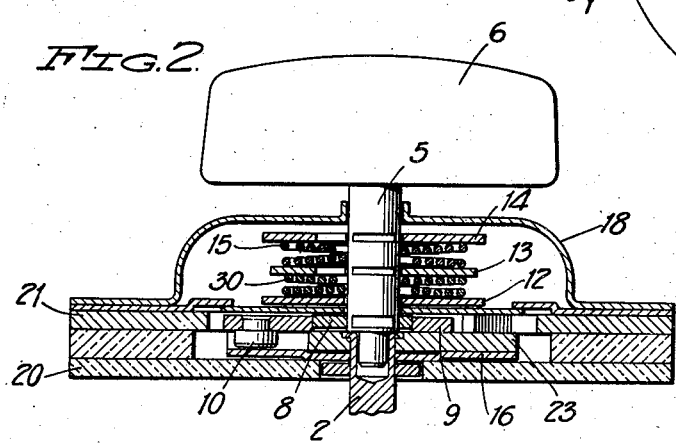
Fig. 2 is a vertical section view of switch operating mechanism embodying the invention.

An alternative arrangement of dual springs utilizing the principle of balanced forces is illustrated in Fig. 4, wherein opposite ends 15x, 15y, of one spring 15 may engage the driving and driven arms 12a and 12b, respectively, at diametrically opposed sides of the mechanism. Likewise, the end 30y of spring 30 will engage arms 12b and end 30x will engage arm 12a. The escapement is identical with that of the previous figures, but the tension created in the two springs by the turning of the driving unit results in the application of the torque of the upper spring 15 to the arm of the driven member diametrically opposite to the driving arm of the driving member. The same applies to the lower spring.

Other modifications within the scope of my invention will occur to those skilled in the art. Therefore I do not limit the invention to the exact form and arrangement illustrated in the drawing.

I claim:

1. In an electric snap switch, a rotary driven element comprising a plate with parallel diametrically opposite arms extending parallel to the axis of rotation of said plate, driving means separately rotatable about said plate axis and comprising a spindle, a pair of spiralled springs wound around the spindle, a plate rotating with the spindle and having parallel diametrically-opposed arms, the ends of one spring being extended radially to engage opposite sides of one driving and one driven arm, the ends of the other spring being radially extended to engage opposite sides of the other driving and the other driven arms.

2. In an electric snap switch, a rotary driven element comprising a plate with parallel diametrically opposite arms extending parallel to the axis of rotation of said plate, driving means separately rotatable about said plate axis and comprising a spindle, a pair of spiralled springs wound around the spindle, a member rotating with said spindle having arms normally in register with said driven arms, the ends of said springs extending radially and engaging said driven arms and said driving arms to create a turning force in the form of a couple acting to rotate said driven member when said driving member is turned.

3. In an electric snap switch, a rotary driven element comprising a plate with parallel diametrically opposite arms extending parallel to the axis of rotation of said plate, driving means separately rotatable about said plate axis and comprising a spindle, a pair of spiralled springs wound around the spindle, a plate rotating with the spindle and having parallel diametrically-opposed arms, the ends of one spring being extended radially to engage opposite arms of said driving and driven members, the ends of the other spring being extended radially to engage opposite arms of said driving and driven members but on opposite sides of said arms from the ends of said first spring.

4. In an electric switch, a driven shaft, a driven member rotating with said shaft, a driving spindle co-axial with said shaft, said shaft and spindle having interengaging end portions forming a bearing for said spindle, driving means turnable with said spindle, spring means stressed by rotary movement of said driving means and engaging with said driven member to exert force substantially in the form of a couple acting to rotate said driven shaft, and escapement means holding said driven member during initial rotation of said driving member while said spring means becomes stressed.

5. In an electric snap switch, a rotary driven member, a pair of spiralled springs having ends engaging said member at diametrically opposite points, driving means for stressing said springs to create a force substantially in the form of a couple acting to rotate said driven member when said driving means is turned, and means maintaining said driven member stationary during initial rotation of said driving means in stressing said springs and thereafter freeing said driven member for movement with a snap action.

6. In a rotary electric snap switch of the type having a driving member and a driven member that is normally actuated about an axis by a coiled spring whose ends embrace parallel arms of the driving and driven members, the emergency means for driving the driven member in case of failure of the spring comprising an extension on an arm of the driven member, and an extension on the driving member on the opposite side of the switch axis from said driven-member extension and adapted to engage and drive said driven-member extension on failure of said spring-action.

7. In a rotary electric snap switch of the type having a driving member and a driven member that is normally actuated about an axis by a coiled spring whose ends embrace parallel arms of the driving and driven members and an escapement mechanism holding the driven member during a predetermined travel of said driving member, the emergency means for driving the driven member in case of failure of the spring comprising an extension on an arm of the driven member, and an extension on the driving member, said extensions being spaced a distance greater than said predetermined travel and positioned for engagement in emergency on failure of said spring and travel of said driving extension beyond said predetermined distance.

8. In an electric snap switch, a rotary driven member, a pair of spiralled springs having ends engaging said member at diametrically opposite points, driving means for stressing said springs to create a force substantially in the form of a couple acting to rotate said driven member when said driving means is turned, and means maintaining said driven member stationary during predetermined rotation of said driving means in stressing said springs and thereafter freeing said driven member for movement with a snap action, an extension on said driven member, an extension on said driving member, said extensions being spaced a distance greater than said predetermined rotation and being normally non-engageable but positioned for engagement in emergency on relative rotation of said driving and driven members in amount greater than said predetermined rotation whereby to directly operate said driven member.

9. In an electric snap switch, a rotary driven element comprising a plate with parallel diametrically opposite arms extending parallel to the axis of rotation of said plate, driving means separately rotatable about said plate axis and comprising a spindle, a pair of spiralled springs wound around the spindle, a plate rotating with the spindle and having parallel diametrically opposed arms, the ends of one spring being extended radially to engage opposite arms of said driving and driven members, the ends of the other spring being extended radially to engage opposite arms of said driving and driven members but on opposite sides of said arms from the ends of said first spring, an extension on one of said driven arms, said driving means having an extension engageable with said driven arm extension in emergency but normally non-engageable therewith.

10. In an electric snap switch, a rotary driven member, a pair of spiraled springs, the ends of said springs being engageable with said driven member at diametrically opposite points, rotary driving means engageable with both ends of each spring for compressing said springs and creating a force substantially in the form of a couple acting on said driven member when said driving means is turned in either clockwise or counterclockwise directions.

HAROLD E. SCHLEICHER.